United States Patent
Senfleben et al.

(10) Patent No.: US 9,564,072 B2
(45) Date of Patent: Feb. 7, 2017

(54) METHODS AND APPARATUS TO GENERATE LOADING DOCK VISUAL INDICATORS

(71) Applicants: Jason Senfleben, Milwaukee, WI (US); Jeffrey Budoff, Germantown, WI (US); Nicholas Klotz, West Allis, WI (US); Bradley J. Stone, Port Washington, WI (US)

(72) Inventors: Jason Senfleben, Milwaukee, WI (US); Jeffrey Budoff, Germantown, WI (US); Nicholas Klotz, West Allis, WI (US); Bradley J. Stone, Port Washington, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 598 days.

(21) Appl. No.: 13/935,006

(22) Filed: Jul. 3, 2013

(65) Prior Publication Data

US 2015/0009046 A1   Jan. 8, 2015

(51) Int. Cl.
| G08G 1/00 | (2006.01) |
| G09F 21/04 | (2006.01) |
| B65G 69/00 | (2006.01) |
| G09F 13/22 | (2006.01) |

(52) U.S. Cl.
CPC .............. *G09F 21/04* (2013.01); *B65G 69/005* (2013.01); *G09F 2013/227* (2013.01)

(58) Field of Classification Search
CPC ........................................................ G08G 1/09

USPC .............................. 340/901, 506, 539.1, 539.11
See application file for complete search history.

(56) References Cited

U.S. PATENT DOCUMENTS

| 5,071,306 A  | * | 12/1991 | Alexander ........... | B65G 69/003 |
|              |   |         |                      | 14/71.5     |
| 5,453,735 A  | * | 9/1995  | Hahn .................... | B65G 69/003 |
|              |   |         |                      | 340/687     |
| 5,831,540 A  |   | 11/1998 | Sullivan et al.      |             |
| 6,329,931 B1 | * | 12/2001 | Gunton ................ | B65G 69/003 |
|              |   |         |                      | 340/686.1   |
| 6,975,226 B2 |   | 12/2005 | Reynard et al.       |             |
| 7,119,673 B2 | * | 10/2006 | Eager .................. | G05B 23/0272 |
|              |   |         |                      | 340/500     |
| 7,256,703 B2 |   | 8/2007  | Duvernell et al.     |             |
| 7,274,300 B2 |   | 9/2007  | Duvernell et al.     |             |
| 7,757,442 B2 |   | 7/2010  | Hoffmann et al.      |             |
| 2004/0253085 A1 | * | 12/2004 | Smith, Jr. ............. | B60P 1/431 |
|              |   |         |                      | 414/469     |
| 2005/0261786 A1 |   | 11/2005 | Eager et al.       |             |
| 2006/0181391 A1 |   | 8/2006  | McNeill et al.     |             |
| 2007/0031224 A1 | * | 2/2007  | Lutz .................... | B65G 69/006 |
|              |   |         |                      | 414/440     |
| 2008/0127435 A1 |   | 6/2008  | Maly et al.        |             |
| 2010/0146719 A1 | * | 6/2010  | Swessel ............. | B65G 69/2882 |
|              |   |         |                      | 14/71.3     |

(Continued)

*Primary Examiner* — Daryl Pope

(74) *Attorney, Agent, or Firm* — Hanley, Flight & Zimmerman, LLC

(57) ABSTRACT

Methods, apparatus, systems and articles of manufacture are disclosed herein. An example method disclosed herein includes determining a state of a device of a loading dock and, based on the state, generating via a display a first directional indicator having a first orientation and a first color. The first orientation and the first color are to cooperate to indicate first directional information.

19 Claims, 11 Drawing Sheets

(56) References Cited

U.S. PATENT DOCUMENTS

| | | |
|---|---|---|
| 2011/0075441 A1 | 3/2011 | Swessel et al. |
| 2014/0062691 A1* | 3/2014 | Graham .................. B60Q 7/00 |
| | | 340/473 |
| 2014/0071661 A1* | 3/2014 | Zealer .................. F21S 10/002 |
| | | 362/101 |
| 2015/0127222 A1* | 5/2015 | Cunningham, III ... B60Q 1/488 |
| | | 701/41 |
| 2016/0009177 A1* | 1/2016 | Brooks .................. B60K 35/00 |
| | | 340/468 |

* cited by examiner

METHODS AND APPARATUS TO GENERATE LOADING DOCK VISUAL INDICATORS

FIELD OF THE DISCLOSURE

This disclosure relates generally to loading docks and, more particularly, to methods and apparatus to generate loading dock visual indicators.

BACKGROUND

A loading dock typically includes a vehicle restraint to restrain a vehicle docked at the loading dock. The loading dock may also include a traffic signal having a red light and a green light to indicate if personnel should enter a trailer of the vehicle via the loading dock or if the vehicle can depart from the loading dock.

Figure 1:
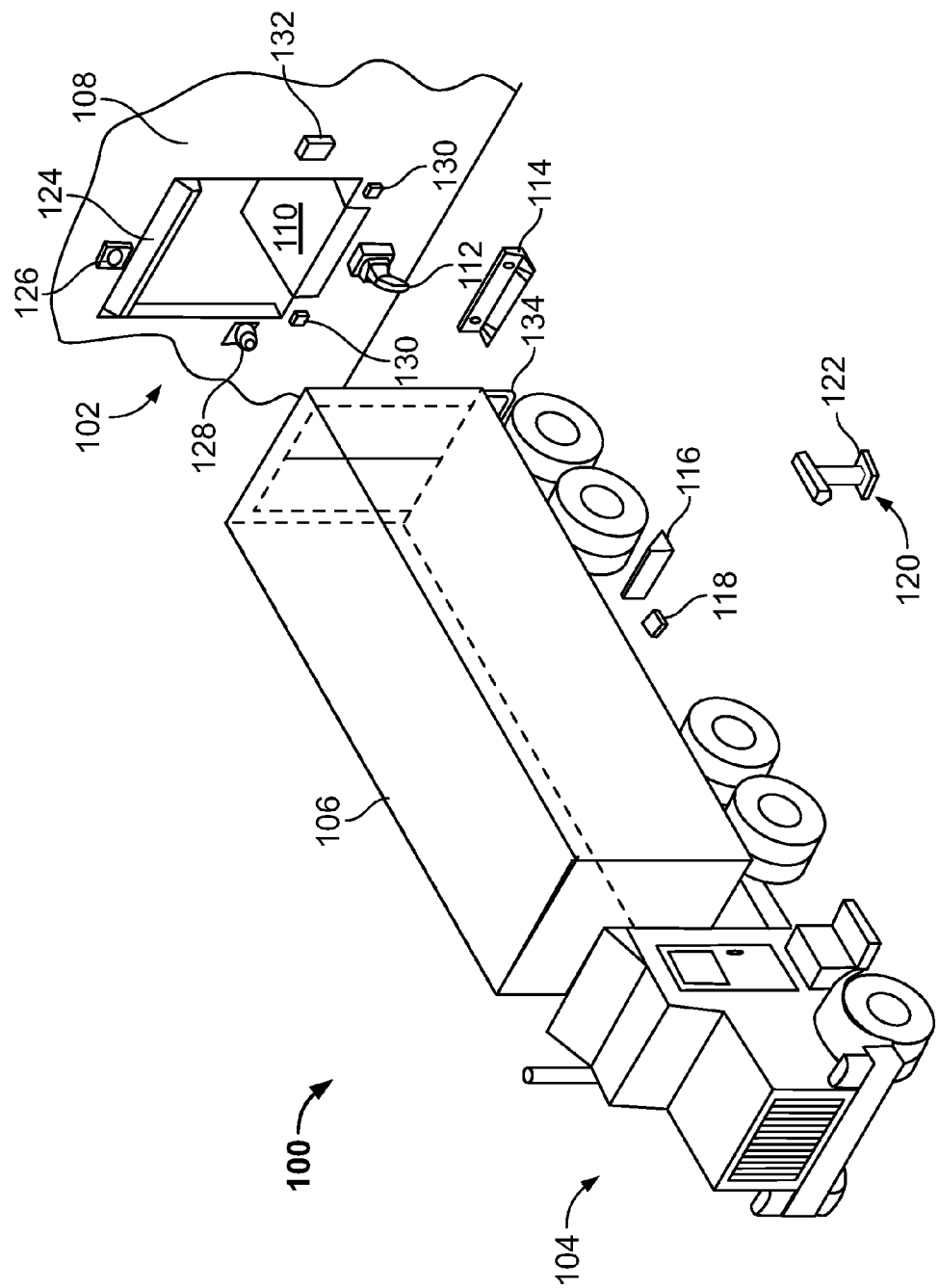
FIG. 1 is an exterior, perspective view of a vehicle and an example loading dock disclosed herein including a first display.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to generate loading dock visual indicators are disclosed herein. An example apparatus includes a controller in communication with a vehicle restraint of a loading dock. The example apparatus also includes a display in communication with the controller. The display is to display a first directional indicator having a first orientation and a first color if a vehicle is restrained via the vehicle restraint. The display is to display a second directional indicator having a second orientation and a second color if the vehicle is not restrained via the vehicle restraint.

Another example apparatus disclosed herein includes a controller in communication with a device of a loading dock. The controller is to determine a state of the device. The example apparatus also includes a display in communication with the controller. The display is to display a first directional indicator based on the state. The first directional indicator is to have a first characteristic to indicate a direction and a second characteristic to indicate at least one of permissiveness or nonpermissiveness.

An example method disclosed herein includes determining a state of a device of a loading dock and, based on the state, generating via a display a first directional indicator having a first orientation and a first color. The first orientation and the first color are to cooperate to indicate first directional information.

Example methods and apparatus disclosed herein are used to generate visual indicators that are visible to personnel operating and/or disposed near a loading dock. The loading dock may be used to load and/or unload cargo between a vehicle and a facility. The example visual indicators disclosed herein are displayed via a display. In some examples, the display is disposed inside the facility to inform personnel inside the facility if the personnel may enter the vehicle via the loading dock. In some examples, the display is disposed outside the facility to inform personnel outside the facility if the vehicle may dock at the loading dock and/or depart from the loading dock.

An example visual indicator disclosed herein includes a directional indicator such as, for example, one or more pointers (e.g., arrows, arrowheads, chevrons, etc.) and a graphic. In some examples, the directional indicator has a first characteristic and a second characteristic to indicate directional information. For example, the directional indicator may have an orientation to indicate a given direction and a color to indicate permissiveness or nonpermissiveness. More specifically, in some examples, the directional indicator includes green pointers pointing toward the graphic to indicate that personnel may enter the vehicle via the loading dock. In some examples, the directional indicator includes red pointers pointing away from the graphic to indicate that the personnel should not enter the vehicle via the loading dock.

FIG. 1 is a perspective view of an example vehicle 100 and an example loading dock 102 disclosed herein. In the illustrated example, the vehicle 100 includes a tractor 104 and a trailer 106. However, other types of vehicles such as straight trucks, vans and/or any other types of vehicles are used in other examples. The example vehicle 100 of FIG. 1 is used to ship cargo to and/or from a facility 108 via the loading dock 102. In the illustrated example, the loading dock 102 includes a plurality of devices such as, for example, a dock leveler 110, a vehicle restraint 112 (e.g., a rotating hook restraint, a vertical barrier restraint, a rear impact guard restraint, and/or any other vehicle restraint), a wheel lock 114, a wheel chock 116 having a first sensor 118, a trailer stand 120 having a second sensor 122, a door 124, a speaker 126, a camera 128, one or more proximity or presence sensors 130, and a first display 132. In other examples, the loading dock 102 includes different and/or additional devices such as, for example, a dock shelter.

In the illustrated example, when the vehicle 100 docks at the loading dock 102, the example vehicle restraint 112 engages the vehicle 100 to restrain the vehicle. In some examples, the vehicle restraint 112 engages a rear impact guard (RIG) 134 of the trailer 106 to stabilize the trailer 106, reduce vibrations or jolts of the trailer 106, prevent vertical and/or horizontal movement of the trailer 106, prevent separation of the trailer 106 from a dock shelter and/or restrain the vehicle 100 in other ways.

Figure 2:
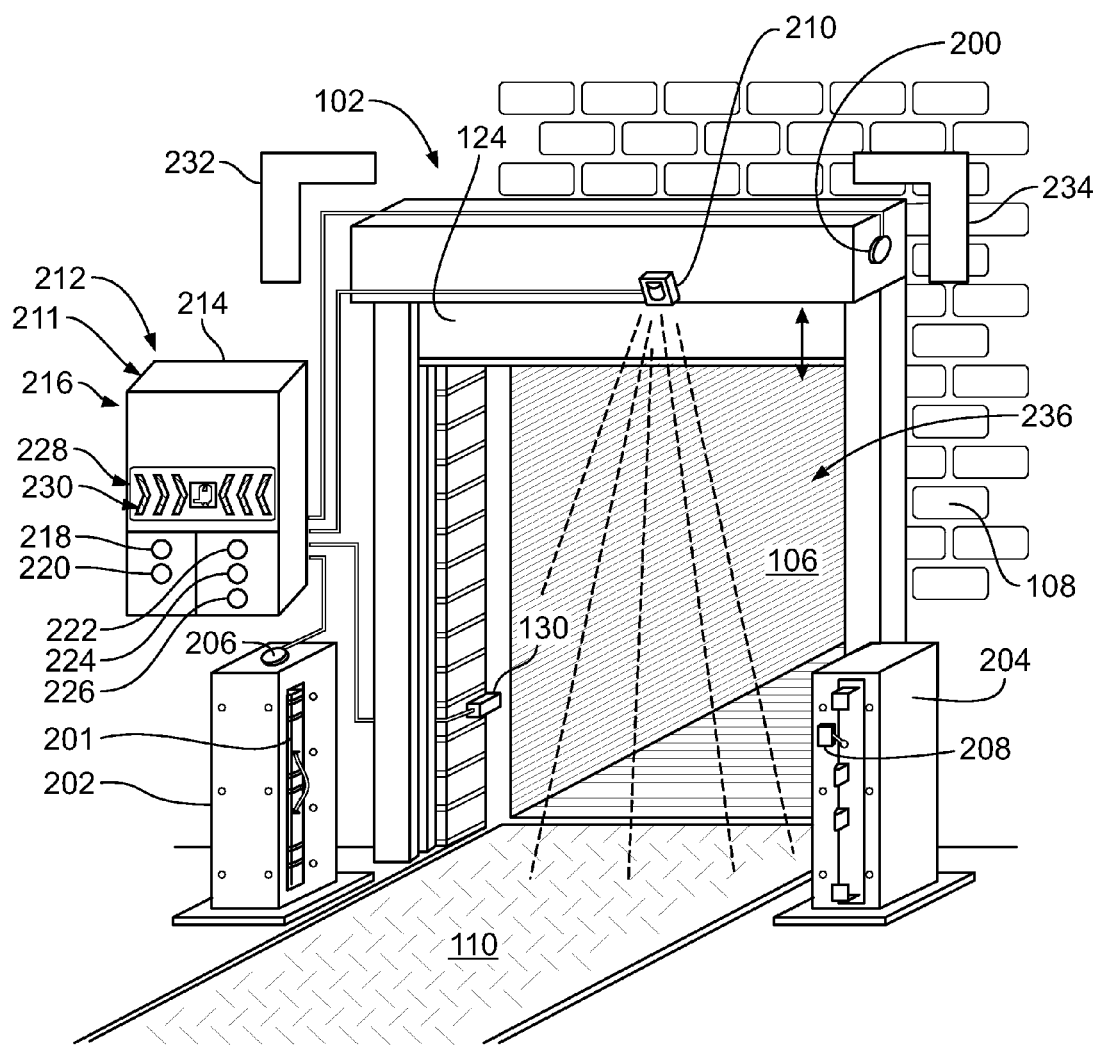
FIG. 2 illustrates an interior facility view of the example vehicle of FIG. 1 docked at the example loading dock of FIG. 2 and an example control box having a controller and a second display displaying an example first visual indicator.

The example first display 132 displays visual indicators to indicate directional information to personnel such as, for example, a driver of the vehicle 100. As described in greater detail below in conjunction with FIG. 2, the example first display 132 of FIG. 1 is in communication with a controller 212 (FIG. 2). In some examples, the first display 132 is in communication with one or more different and/or additional devices of the loading dock 102 such as, for example, the vehicle restraint 112, the wheel lock 114, the first sensor 118, the second sensor 122, the door 124, the speaker 126, the camera 128, the proximity sensor(s) 130, a door sensor 200 (FIG. 2), a first barrier sensor 206 (FIG. 2), a second barrier sensor 208 (FIG. 2), an object detector 210 (FIG. 2) and/or other devices.

In some examples, the first display 132 displays the visual indicators based on a state of one or more devices of the loading dock 102. For example, if the vehicle restraint 112 is in an engaged state in which the vehicle restraint 112 is restraining the vehicle 100, the first display 132 displays a first visual indicator. In some examples, the first visual indicator includes a first directional indicator having a first color to indicate first directional information such as, for example, that the vehicle 100 should not be moved relative to the loading dock 102. If the example vehicle restraint 112 is in a disengaged state in which the vehicle restraint 112 is not restraining the vehicle 100, the first display 132 displays a second visual indicator that includes a second directional indicator having a second color to indicate second directional information such as, for example, that the vehicle 100 may be moved to dock the vehicle 100 at the loading docket 102 and/or to leave the facility 108. Some example visual indicators that may be used to implement the example first display 132 of FIG. 1 are described in greater detail below in conjunction with FIGS. 6-11.

FIG. 2 is a perspective view of the example loading dock 102 of FIG. 1 from inside the example facility 108. In the illustrated example, the door 124 is open and the example vehicle 100 is docked at the loading dock 102. The example door 124 of FIGS. 1-2 includes a door sensor 200 to detect a position of the door 124.

In the illustrated example, a barrier 201 is disposed inside the facility 108 adjacent the loading dock 102. The example barrier 201 of FIG. 2 is in a retracted position in which the barrier 201 is substantially disposed in a first stanchion or post 202. When the example barrier 201 is in the retracted position, the barrier 201 does not obstruct a path along the leveler 110 to the loading dock 102. In some examples, the barrier 201 is disposed across the leveler 110 to an extended position and coupled to a second stanchion or post 204 to obstruct the path along the leveler 110. In the illustrated example, the first post 202 includes a first barrier sensor 206. The example second post 204 includes a second barrier sensor 208 to detect if the barrier 201 is in the retracted position or the extended position.

The example loading dock 102 of FIG. 2 also includes an object detector 210. In the illustrated example, the object detector 210 detects if an object (e.g., personnel, a fork truck, cargo, etc.) is present on the leveler 110 and/or inside the facility 108 adjacent the loading dock 102. In some examples, the object detector 210 includes a metal detector, a motion detector, a weight detector, an infrared sensor, and/or any type of sensor and/or detector to detect an object.

In the illustrated example, a control box 211 is disposed inside the facility 108. The example control box 211 of FIG. 2 includes a controller 212 to control and/or monitor one or more devices of the example loading dock 102. In the illustrated example, the controller 212 is in communication with the first display 132, the vehicle restraint 112, the wheel lock 114, the first sensor 118, the second sensor 122, the door 124, the speaker 126, the camera 128, the proximity sensor(s) 130, the door sensor 200, the first barrier sensor 206, the second barrier sensor 208, the object detector 210 and/or any other device of the loading docket 102.

In the illustrated example, the control box 211 includes a housing 214. The example housing 214 includes a second display 216. In the illustrated example, the control box 211 also includes input devices 218, 220, 222, 224, 226 in communication with the controller 212. In some examples, one or more of the input devices 218, 220, 222, 224, 226 are operated to control the vehicle restraint 112, the barrier 201, the door 124, a horn or alarm, the second display 216 and/or any other device of the loading dock 102. The example input devices 218, 220, 222, 224, 226 of FIG. 2 may include buttons, switches, a touchscreen, and/or any other input devices.

In the illustrated example, the controller 212 generates one or more visual indicators via the second display 216. In some examples, the controller 212 generates the visual indicators based on a state of one or more devices of the loading dock 102. For example, the vehicle restraint 112 may include a switch and/or sensor in communication with the controller 212. When the vehicle restraint 112 engages the vehicle 100 and/or when the vehicle restraint 112 is not engaging the vehicle 100, the switch and/or sensor communicates information to the controller 212. Based on the information, the controller 212 determines if the vehicle restraint 112 is in the engaged state or the disengaged state. In some examples, if the vehicle restraint 112 is in the engaged state, the controller 212 generates a first visual indicator 228. If the vehicle restraint 112 is in the disengaged state, the controller 212 generates a second visual indicator 300 (FIG. 3).

In the illustrated example of FIG. 2, the vehicle 100 is docked at the loading dock 102 and the vehicle restraint 112 is restraining the vehicle 100. Thus, the example controller 212 determines that the vehicle restraint 112 is in the engaged state and generates the first visual indicator 228. In the illustrated example, the first visual indicator 228 includes a first directional indicator 230 (e.g., one or more pointers, arrows, arrowheads, chevrons, Xs, and/or any other directional indicator) to indicate directional information such as, for example, that personnel may enter the trailer 106 via the loading dock 102. In other examples, the first visual indicator 228 indicates different and/or additional information. As described in greater detail below in conjunction with FIG. 5, an orientation and a color of the first directional indicator 230 cooperate to indicate the directional information.

In the illustrated example, the loading dock 102 includes light fixtures 232, 234 such as, for example, the light fixtures described in U.S. application Ser. No. 12/568,499, entitled "Light Fixtures for Doorways and Other Areas," filed Sep. 28, 2009, which is hereby incorporated herein by reference in its entirety. In the illustrated example, the light fixtures 232, 234 are disposed above an opening 236 of the loading dock 102. In other examples, the light fixtures 232, 234 are disposed in other locations such as, for example, on and/or adjacent the leveler 110. In some examples, the controller 212 is in communication with the light fixtures 232, 234 to control the light fixtures 232, 234 to, for example, control visual indicators generated via the light fixture 232, 234. In some examples, the light fixtures 232, 234 generate visual indicators cooperating with and/or corresponding to the visual indicators generated via the second display 216. For example, if the first visual indicator 228 is displayed and the first directional indicator 230 is green, the light fixtures 232, 234 may generate green light and/or a green directional indicator similar or identical to the first directional indicator 230. In other examples, the visual indicators generated by the light fixtures 232, 234 cooperate and/or correspond with the visual indicators generated via the second display 216 in other ways.

Figure 3:
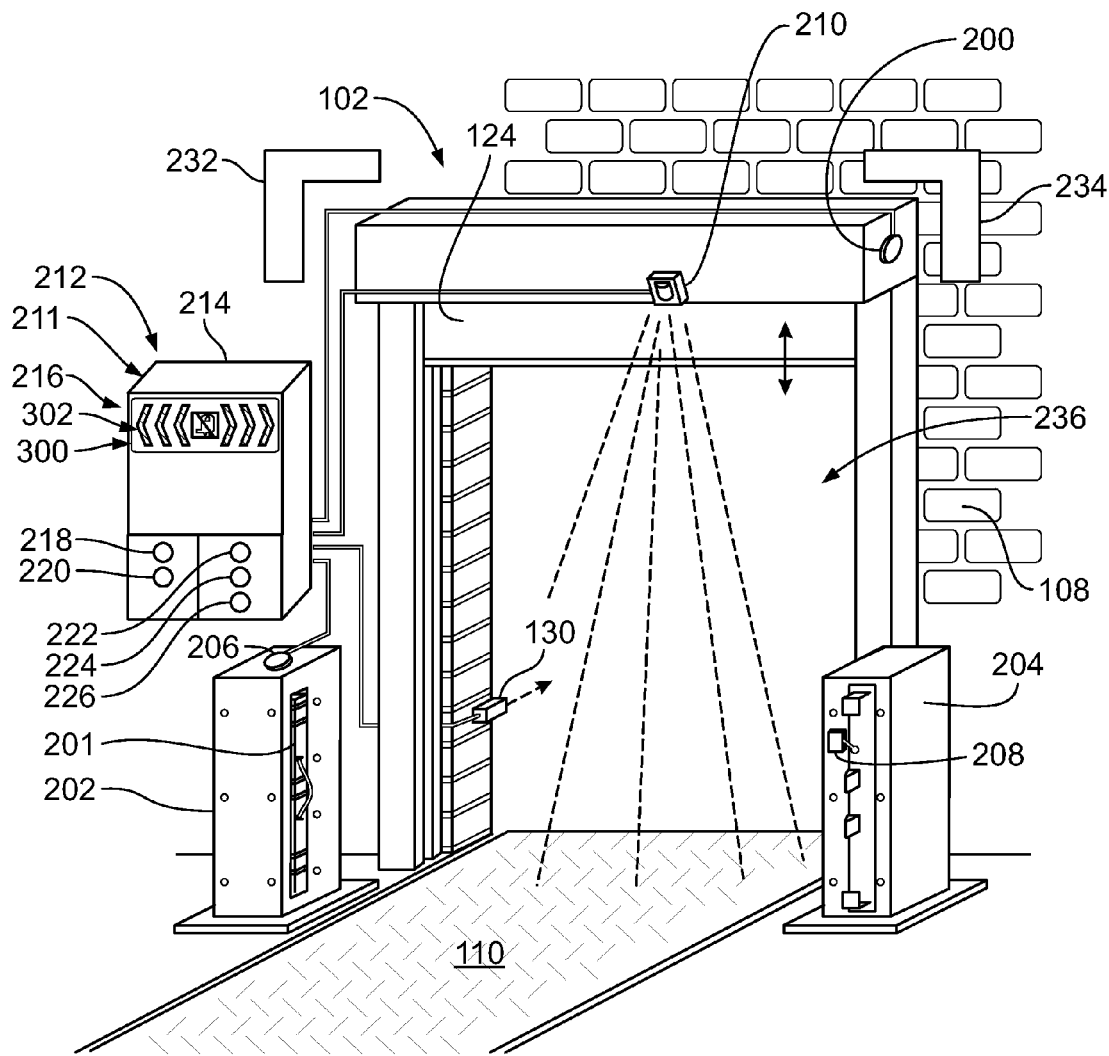
FIG. 3 illustrates the example second display of FIG. 2 displaying an example second visual indicator.

FIG. 3 illustrates the example loading dock 102 of FIGS. 1-2 when the example vehicle 100 is not docked at the loading dock 102. Thus, in the illustrated example, the controller 212 determines that the vehicle restraint 112 is in the disengaged state and generates the second visual indicator 300 via the second display 216. In the illustrated example, the second visual indicator 300 includes a second directional indicator 302 (e.g., one or more pointers, arrows, arrowheads, chevrons, and/or any other directional indicator) to indicate directional information such as, for example, that personnel should not enter the trailer 106 via the loading dock 102. As described in greater detail below in conjunction with FIG. 5, an orientation and a color of the second directional indicator 302 cooperates to indicate the directional information. In other examples, the second visual indicator 300 indicates different and/or additional information.

In some examples, the controller 212 causes the light fixtures 232, 234 to generate visual indicators corresponding to and/or cooperating with the second visual indicator 300. For example, if the second visual indicator 300 is displayed and the second directional indicator 302 is red, the light fixtures 232, 234 may generate red light and/or a red directional indicator similar or identical to the second directional indicator 302. In other examples, the light fixtures 232, 234 generate visual indicators that correspond to and/or cooperate with the second visual indicator 300 in other ways.

Figure 4:
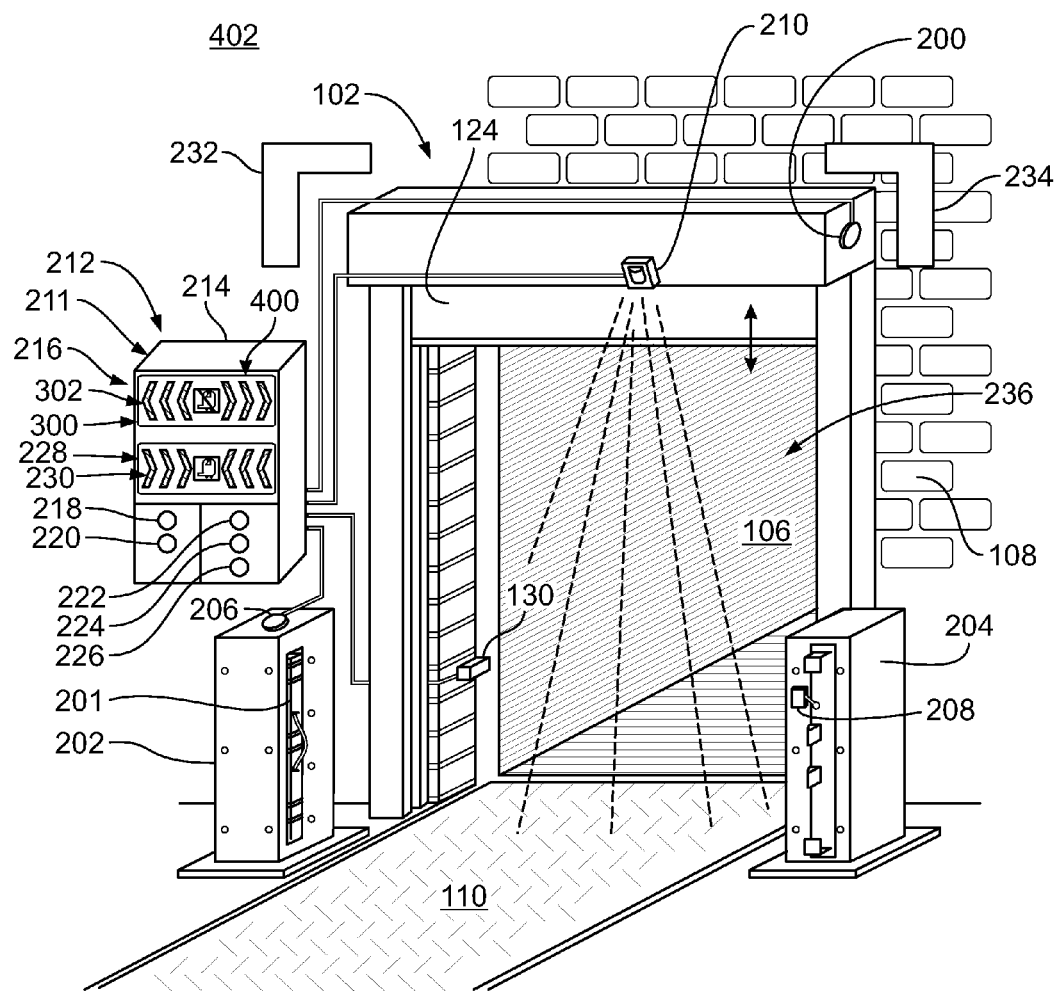
FIG. 4 is illustrates the example second display of FIGS. 2-3 displaying an example third visual indicator.

FIG. 4 illustrates an example third visual indicator 400 displayed via the second display 216. In some examples, the controller 212 generates the third visual indicator 400 via the second display 216 based on a condition and/or a state of one or more devices of the loading dock 102. For example, if the vehicle 100 is docked at the loading dock 102 and the wheel lock 114 and/or the wheel chock 116 is used to restrain the vehicle 100 instead of the vehicle restraint 112, the controller may cause the second display 216 to display the third visual indicator 400 to indicate information such as, for example, that personnel should proceed with heightened caution when entering the trailer 106.

In some examples, the controller 212 may cause the third visual indicator 400 to be periodically displayed (e.g., repeatedly flash). In the illustrated example, the third visual indicator 400 is generated by displaying the first visual indicator 228 and the second visual indicator 300 substantially contemporaneously. In some examples, the third visual indicator 400 is generated by displaying the first visual indicator 228 and second visual indicator 300 at different times such as, for example, by displaying the first visual indicator 228 and the second visual indicator 300 in an alternating fashion.

Although the above-noted visual indicators 228, 300, 400 are described as being generated based on the state of the example vehicle restraint 112, in other examples, the first visual indicator 228, the second visual indicator 300, the third visual indicator 400 and/or other visual indicators are generated based on states of one or more different and/or additional devices of the loading dock 102 and/or devices in communication with the controller 212. For example, the first visual indicator 228 may be generated if the example door 124 is open, the barrier 201 is in the retracted position, and the vehicle restraint 112 is in the engaged state. In some examples, the second visual indicator 300 is generated if the door 124 is closed. In some examples, the first visual indicator 228, the second visual indicator 300, the third visual indicator 400 and/or another visual indicator is generated based on a proximity of the vehicle 100 to the loading dock 102 as detected by the proximity sensor(s) 130. In some examples, the first visual indicator 228, the second visual indicator 300, the third visual indicator 400 and/or other visual indicators are generated based on a position of the barrier 201. For example, the first visual indicator 228 may be generated if the barrier 201 is in the retracted position, and the second visual indicator 300 may be generated if the barrier 201 is in the extended position. In other examples, the first visual indicator 228, the second visual indicator 300, the third visual indicator 400 and/or other visual indicators are generated based on other conditions (e.g., a schedule, a user input, etc.).

In some examples, the controller 212 generates the first visual indicator 228, the second visual indicator 300, third visual indicator 400, and/or other visual indicators in response to an input provided via one or more of the input devices 218, 220, 222, 224, 226. For example, one or more of the example input devices 218, 220, 222, 224, 226 may be associated with the third visual indicator 400. If the example controller 212 determines that the input device(s) associated with the third visual indicator 400 is operated, the controller 212 causes the second display 216 to display the third visual indicator 400.

In the illustrated example, the control box 211 is coupled to a wall 402 adjacent the example loading dock 102. In other examples, the control box 211 is disposed in other locations such as, for example, on the first post 202, on the second post 204, and/or any other location. In some examples, the loading dock 102 employs other displays to display the first visual indicator 228, the second visual indicator 300, the third visual indicator 400 and/or other visual indicators. In some examples, the control box 211 does not include the second display 216, and the second display 216 is disposed on, for example, the first post 202, the second post 204, and/or any other location.

Figure 5:
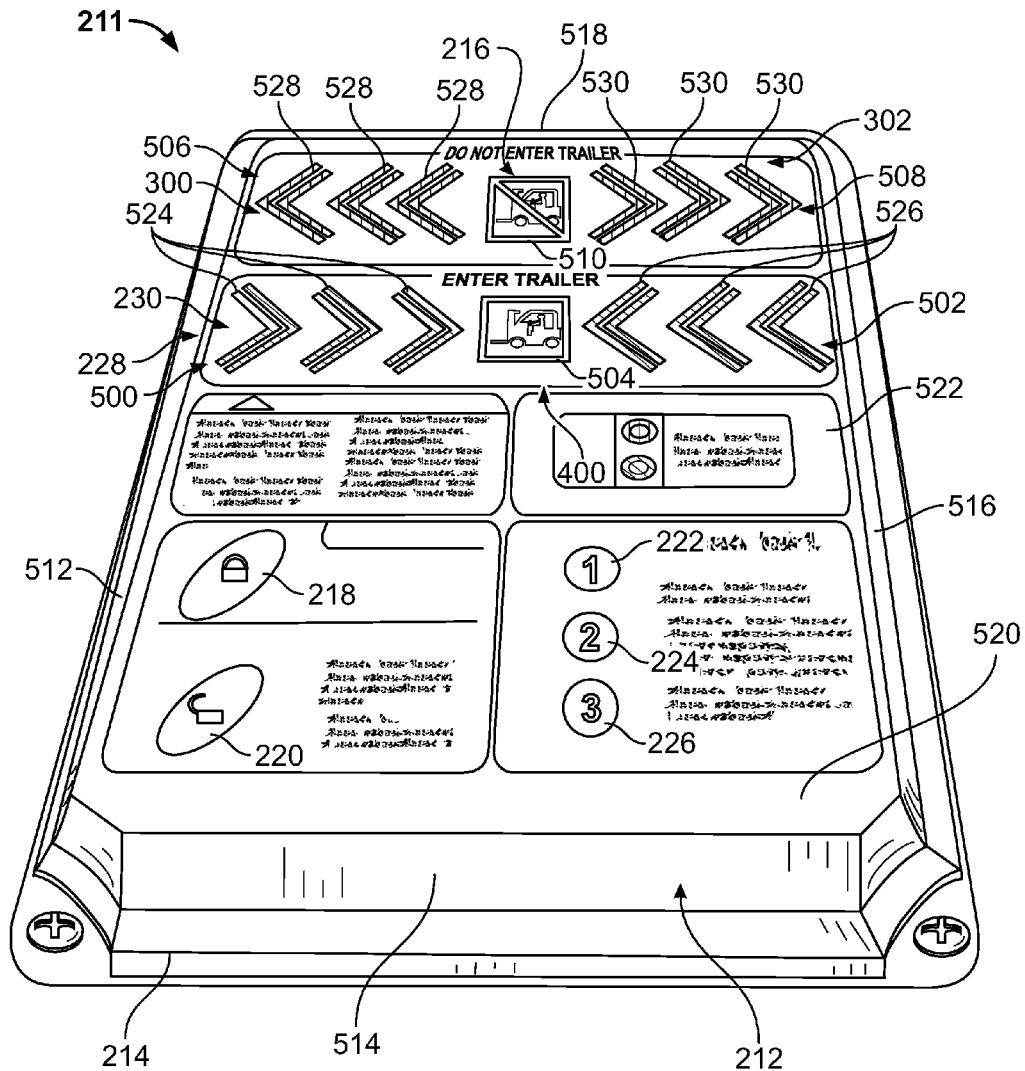
FIG. 5 illustrates the example control box of FIGS. 2-4.

FIG. 5 illustrates the example control box 211 of FIGS. 2-4 when the example first visual indicator 228 and the example second visual indicator 300 are displayed via the second display 216 to display the example third visual indicator 400. In the illustrated example, the first directional indicator 230 of the first visual indicator 228 includes first pointers 500 and second pointers 502 arranged in a first row. In the illustrated example, the first pointers 500 and the second pointers 502 are a first color such as, for example, green. In other examples, the first pointers 500 and/or the second pointers 502 are other colors. The example first visual indicator 228 also includes a first image or graphic 504 disposed in the first row between the first pointers 500 and the second pointers 502. In the illustrated example, the first pointers 500 and the second pointers 502 are pointing toward the first graphic 504. Thus, in the illustrated example, the first pointers 500 are pointing toward the second pointers 502, and the second pointers 502 are pointing toward the first pointers 500. The example first graphic 504 of FIG. 5 is a graphical representation of a fork truck. However, the first graphic 504 may be a graphical representation of other objects (e.g., personnel, the loading dock 102, the trailer 106, and/or any other object), text, a symbol and/or any other graphic(s). Some examples do not include the first graphic 504.

In the illustrated example, an orientation of the first directional indicator 230 and the first color cooperate to indicate first directional information. In some examples, the orientation of the first directional indicator 230 relative to the first graphic 504 indicates a first direction relative to the loading dock 102 and/or the vehicle 100. In some examples, the first color indicates permissiveness and/or a predetermined condition (e.g., the vehicle 100 is restrained). For example, in some examples, the first pointers 500 and the second pointers 502 are displayed in green and oriented to point toward the first graphic 504 to indicate that the vehicle 100 is restrained and/or personnel may enter the trailer 106 of the vehicle 100. Thus, the example first directional indicator 230 includes a first characteristic (e.g., orientation) to indicate the first direction and a second characteristic (e.g., color) to indicate permissiveness. In other examples, the first directional indicator 230 has other colors, orientations and/or characteristics to indicate directional information.

In some examples, when the first visual indicator 228 is displayed, the first visual indicator 228 is displayed substantially continuously. For example, the first visual indicator 228 may be displayed without any intended interruptions. In some examples, the first visual indicator 228 is displayed discontinuously. For example, some or all of the first visual indicator 228 may periodically flash or blink. In some examples, the first visual indicator 228 is animated. For example, each of the first pointers 500 and/or the second pointers 502 may be displayed in a sequence such that the first visual indicator 228 includes one or more pointers that appear to move or scroll across a portion of the second display 216. In some examples, the first pointers 500 and/or the second pointers 502 blink or flash sequentially such that the first visual indicator 228 appears to include one or more pointers that move toward (e.g., converge on) the first graphic 504. Other examples employ other sequences and/or animations.

The example second visual indicator 300 includes third pointers 506 and fourth pointers 508 arranged in a second row. Other examples include other types of directional indicators and/or employ other arrangements. In the illustrated example, the third pointers 506 and the fourth pointers 508 are a second color such as, for example, red. In other examples, the third pointers 506 and/or the fourth pointers 508 are other colors. In the illustrated example, a second graphic 510 is disposed in the second row between the third pointers 506 and the fourth pointers 508. In the illustrated example, the third pointers 506 and the fourth pointers 508 are pointing away from the second graphic 510. Thus, in the illustrated example, the third pointers 506 are pointing away from the fourth pointers 508, and the fourth pointers 508 are pointing away from the third pointers 506. The example second graphic 510 of FIG. 5 includes a line disposed diagonally over a graphical representation of a fork truck. However, the second graphic 510 may be a graphical representation of other objects (e.g., personnel, the loading dock 102, the trailer 106, and/or any other object), text, a symbol and/or any other graphic(s). Some examples do not include the second graphic 510.

In the illustrated example, an orientation of the second directional indicator 302 and the second color cooperate to indicate second directional information. In some examples, the orientation of the second directional indicator 302 relative to the second graphic 510 indicates a second direction relative to the loading dock 102 and/or the vehicle 100. In some examples, the second color indicates nonpermissiveness and/or a predetermined condition (e.g., the vehicle 100 is not restrained). For example, in some examples, the third pointers 506 and the fourth pointers 508 are displayed in red and oriented to point away from the first graphic 504 to indicate that the vehicle 100 is not restrained and/or personnel may not enter the trailer 106 of the vehicle 100. Thus, the example second directional indicator 302 includes a third characteristic (e.g., orientation) to indicate the second direction and a fourth characteristic (e.g., color) to indicate nonpermissiveness. In other examples, the second directional indicator 302 has other orientations, colors, and/or characteristics to indicate directional information.

In some examples, the third visual indicator 400 has a third color such as, for example, yellow, orange, amber and/or any other color. In some examples, the first visual indicator 228 and the second visual indicator 300 are displayed substantially contemporaneously to enable the third visual indicator 400 to have the third color. For example, by displaying the first directional indicator 230 via green light and the second directional indicator 302 via red light substantially contemporaneously, the red light and the green light may combine to display the third visual indicator 400 in yellow. In some examples, when the second visual indicator 300 is displayed, the second visual indicator 300 is displayed substantially continuously. In some examples, the second visual indicator 300 is displayed discontinuously. For example, some or all of the second visual indicator 300 may periodically flash or blink. In some examples, the second visual indicator 300 is animated. For example, each of the third pointers 506 and/or the fourth pointers 508 may be displayed in a sequence such that the second visual indicator 300 includes one or more pointers that appear to move or scroll across a portion of the second display 216. In some examples, the third pointers 506 and/or the fourth pointers 508 blink or flash sequentially such that the second visual indicator 300 appears to include one or more pointers moving away (e.g., diverging) from the second graphic 510. Other examples employ other sequences and/or animations.

In the illustrated example, the first visual indicator 228, the second visual indicator 300 and/or the third visual indicator 400 are generated by shining light from inside the housing 214 to outside the housing 214 via transparent or translucent portions of the housing 214. In the illustrated example, sides 512, 514, 516, 518 and a front face 520 of the housing 214 are substantially transparent. In some examples, the sides 512, 514, 516, 518 and/or the front face 520 are translucent. In the illustrated example, a cover 522 is coupled to the front face 520. In some examples, the cover 522 is a decal. In other examples, the cover 522 is other types of covers. The example cover 522 of FIG. 5 is substantially opaque. In some examples, the control box 211 does not include the cover 522, and portions of the housing 214 are opaque. In the illustrated example, the input devices 218, 220, 222, 224, 226 are operatively coupled to the cover 522.

In the illustrated example, the cover 522 includes first windows 524, second windows 526, third windows 528 and fourth windows 530, respectively. In the illustrated example, the first windows 524, the second windows 526, the third windows 528 and the fourth windows 530 are arrowhead shaped. Other shapes are used in other examples. The example first windows 524 and the example second windows 526 are mirror images of the example third windows 528 and the example fourth windows 528. In the illustrated example, the first windows 524, the second windows 526, the third windows 528 and the fourth windows 530 are translucent portions of the cover 522. The example first windows 524 and the example second windows 526 of FIG. 5 have the first color of the first directional indicator 230. The example third windows 528 and the example fourth windows 530 of FIG. 5 have the second color of the second directional indicator 302. In some examples, the first windows 524, the second windows 526, the third windows 528 and/or the fourth windows 530 are arrowhead shaped molded plastic. In some examples, the first windows 524, the second windows 526, the third windows 528 and/or the fourth windows 530 are apertures defined by the cover 522.

A light source is disposed inside the housing 214. In some examples, the light source includes one or more light emitting diodes (LEDs). In some examples, the LEDs are mounted on and/or coupled to a circuit board disposed inside the housing 214. In other examples, the LEDs are integral to the cover 522. Other types of light sources are used in other examples. In the illustrated example, the controller 212 generates visual indicators (e.g., the first visual indicator 228, the second visual indicator 300, etc.) via the example second display 216 by energizing the light source to illuminate (e.g., shine light through) the face 520 of the housing 214 and one or more of the first windows 524, the second windows 526, the third windows 528 and/or the fourth windows 530. In some examples, the light source also illuminates the sides 512, 514, 516, 518 of the housing 214 and/or other portions of the housing 214.

More specifically, the example controller 212 generates the first visual indicator 228 by illuminating the first windows 524 and the second windows 526. For example, illuminating the first windows 524 generates the first pointers 500 of the first directional indicator 230 and illuminating the second windows 526 generates the second pointers 502 of the first directional indicator 230. In the illustrated example, the first graphic 504 is substantially permanently displayed. For example, the first graphic 504 may be painted, printed and/or coupled to the cover 522. In some examples, the first graphic 504 is displayed by illuminating a window having a shape and/or pattern of the first graphic 504.

In the illustrated example, the controller 212 of FIG. 5 generates the second visual indicator 300 by illuminating the third windows 528 and the fourth windows 530. In the illustrated example, illuminating the third windows 528 generates the third pointers 506 of the second directional indicator 302 and illuminating the fourth windows 508 generates the fourth pointers 508 of the second directional indicator 302. In the illustrated example, the second graphic 510 is substantially permanently displayed. For example, the second graphic 510 may be painted, printed and/or coupled to the cover 522. In some examples, the second graphic 510 is displayed by illuminating a window having a shape and/or pattern of the second graphic 510.

In other examples, the second display 216 is implemented in other ways. For example, one or more light sources may be disposed outside of the housing 214 to generate visual indicators. In some examples, the display 216 is implementing using an electronic display screen such as, for example, a computer monitor, a liquid crystal display, and/or any other electronic display screen.

Figure 6:
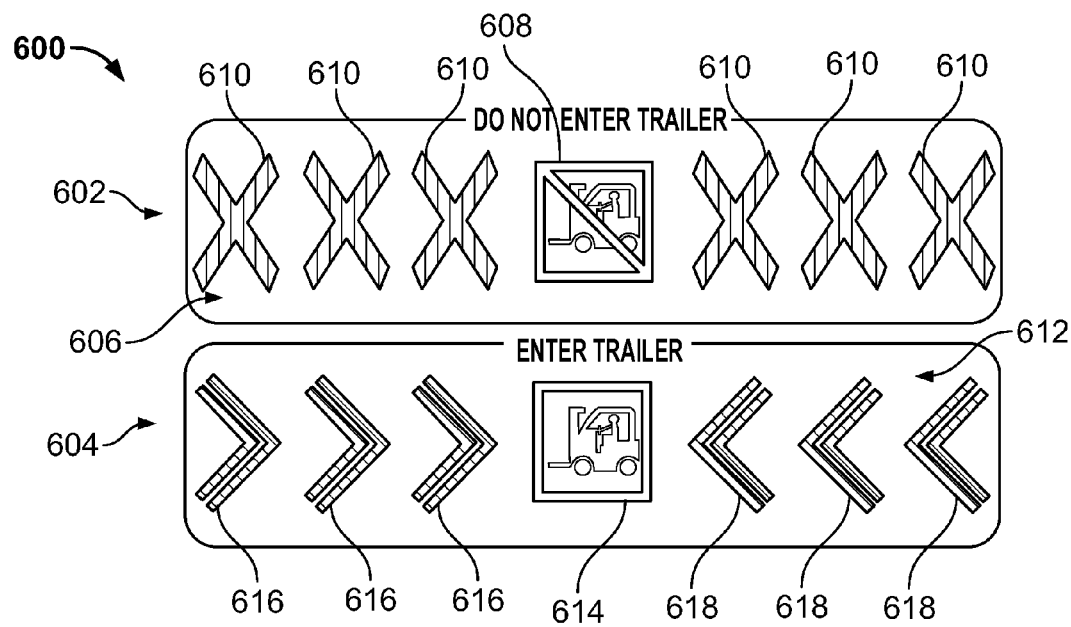
FIG. 6 illustrates an example display disclosed herein, which may be used to implement the example first display of FIG. 1 and/or the example second display of FIGS. 2-4.

FIG. 6 illustrates another example display 600 disclosed herein, which may be used to implement the example second display 216 of FIGS. 2-5 and/or the example first display 132 of FIG. 1. The example display 600 displays a first visual indicator 602 and/or a second visual indicator 604. In the illustrated example, the first visual indicator 602 includes a first directional indicator 606 and a first graphic 608. In the illustrated example, the first directional indicator 606 includes six Xs 610 disposed in a first row. The first graphic 608 is disposed in the first row between a first three of the Xs 610 and a second three of the Xs 610. Other examples include other numbers of the Xs 610.

The example second visual indicator 604 includes a second directional indicator 612 and a second graphic 614. In the illustrated example, the second directional indicator 612 of FIG. 6 includes three first pointers 616 and three second pointers 618 disposed in a second row. Other examples include other numbers of first pointers 616 and/or second pointers 618. In the illustrated example, the second graphic 614 is disposed in the second row between the first pointers 616 and the second pointers 618. In the illustrated example, the first pointers 616 and the second pointers 616 are pointing toward the second graphic 614.

Figure 7:
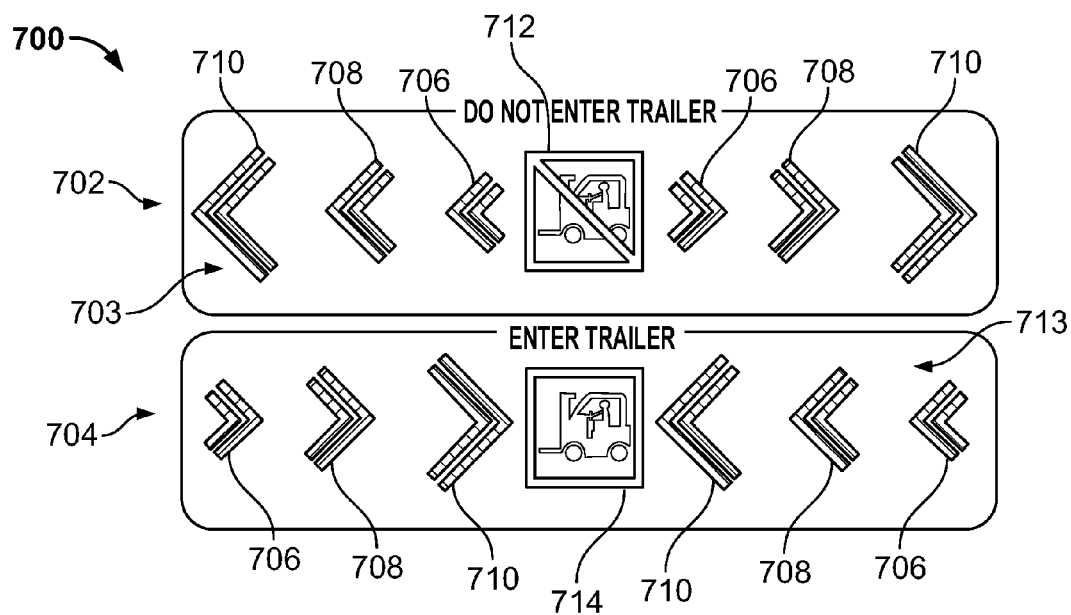
FIG. 7 illustrates another example display disclosed herein, which may be used to implement the example first display of FIG. 1 and/or the example second display of FIGS. 2-4.

FIG. 7 illustrates another example display 700 disclosed herein, which may be used to implement the example second display 216 of FIGS. 2-5 and/or the example first display 132 of FIG. 1. The example display 700 displays a first visual indicator 702 and/or a second visual indicator 704.

In the illustrated example, the first visual indicator 702 includes a first directional indicator 703 having two first pointers 706, two second pointers 708 and two third pointers 710. Other examples include other numbers of the first pointers 706, the second pointers 708 and/or the third pointers 710. In the illustrated example, a first one of each of the first pointers 706, the second pointers 708 and the third pointers 710 are respectively disposed on a first side of a first graphic 712, and a second one of each of the first pointers 706, the second pointers 708 and the third pointers 710 are respectively disposed on a second side of the first graphic 712. In the illustrated example, the example first pointers 706 are a first size, the example second pointers 708 are a second size greater than the first size, and the example third pointers 710 are a third size greater than the second size. The example first pointers 706, the example second pointers 708 and the example third pointers 710 of the first directional indicator 703 of FIG. 7 are pointing away from the example first graphic 712.

In some examples, the first pointers 706, the second pointers 708 and/or the third pointers 610 of the first directional indicator 703 are displayed substantially contemporaneously. In some examples, the first pointers 706, the second pointers 708 and/or the third pointers 710 of the first directional indicator 703 are displayed at different times. For example, in some examples, the first pointers 706 are displayed during a first time slot, the second pointers 708 are displayed during a second time slot, and the third pointers 710 are displayed in a third time slot. As a result, the example first visual indicator 702 may appear to be pointers on each side of the first graphic 712 moving in opposite directions away from the first graphic 712 and increasing in size.

The example second visual indicator 704 includes a second directional indicator 713 having two of the first pointers 706, two of the second pointers 708 and two of the third pointers 710. A first one of each of the first pointers 706, the second pointers 708 and the third pointers 710 are respectively disposed on a first side of a second graphic 714, and a second one of each of the first pointers 706, the second pointers 708 and the third pointers 710 are respectively disposed on a second side of the first graphic 714. The example first pointers 706, the example second pointers 708 and the example third pointers 710 of the second visual indicator 704 point toward the example second graphic 714.

In some examples, the first pointers 706, the second pointers 708 and/or the third pointers 710 of the second directional indicator 713 are displayed substantially contemporaneously. In other examples, the first pointers 706, the second pointers 708 and the third pointers 710 are displayed at different times. In some examples, the first pointers 706 are displayed during a first time slot, the second pointers 708 are displayed during a second time slot, and the third pointers 710 are displayed during a third time slot. As a result, the example second directional indicator 713 may appear to be pointers on each side of the second graphic 714 moving in opposite directions toward the second graphic 714 and increasing in size.

Figure 8:
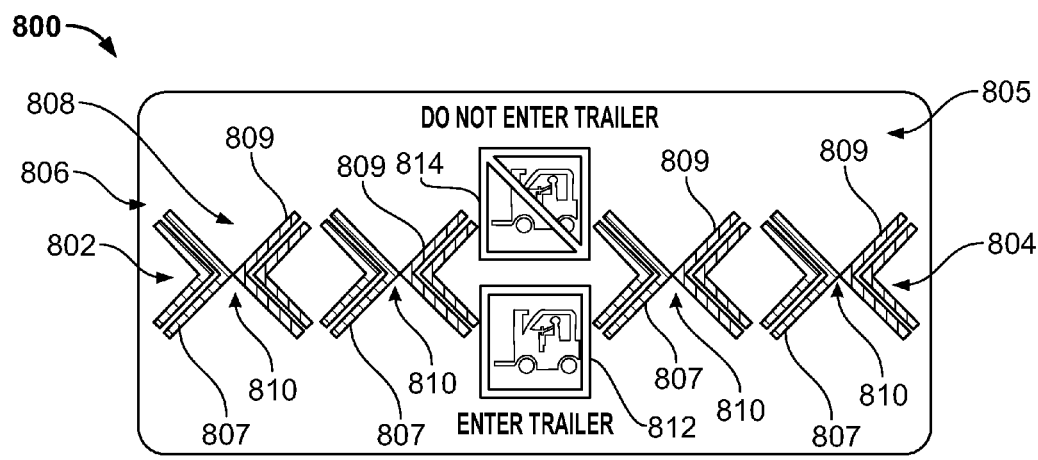
FIG. 8 illustrates yet another example display disclosed herein, which may be used to implement the example first display of FIG. 1 and/or the example second display of FIGS. 2-4.

FIG. 8 illustrates another example display 800 disclosed herein, which may be used to implement the example second display 216 of FIGS. 2-5 and/or the example first display 132 of FIG. 1. The example display 800 displays a first visual indicator 802, a second visual indicator 804 and/or a third visual indicator 805. The example first visual indicator 802 of FIG. 8 includes a first directional indicator 806. In the illustrated example, the first directional indicator 806 includes first pointers 807 pointing in a first direction. In the illustrated example, the first pointers 807 are pointing to the right in the orientation of FIG. 8.

The example second visual indicator 804 includes a second directional indicator 808. In the illustrated example, the second directional indicator 808 includes second pointers 809 pointing in a second direction opposite the first direction. In the illustrated example, the second pointers 809 are pointing to the left in the orientation of FIG. 8.

In the illustrated example, the first visual indicator 802 and the second visual indicator 804 are displayed to display the third visual indicator 805. In the illustrated example, the first pointers 807 and the second pointers 809 are disposed in a row and are arranged such that when the first pointers 807 and the second pointers 809 are displayed substantially contemporaneously, the first pointers 807 and the second pointers 809 form Xs 810.

In some examples, the first visual indicator 802 includes a first graphic 812, and the second visual indicator 804 includes a second graphic 814. In the illustrated example, the first graphic 812 and the second graphic 814 are disposed in a column along the row.

Figure 9:
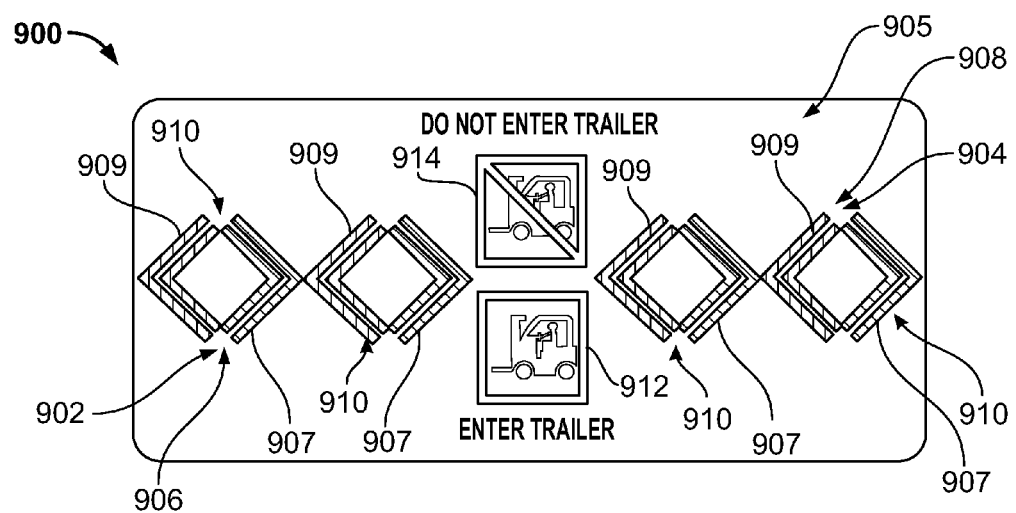
FIG. 9 illustrates another example display disclosed herein, which may be used to implement the example first display of FIG. 1 and/or the example second display of FIGS. 2-4.

FIG. 9 illustrates yet another example display 900 disclosed herein, which may be used to implement the example second display 216 of FIGS. 2-5 and/or the example first display 132 of FIG. 1. The example display 900 displays a first visual indicator 902, a second visual indicator 904 and/or a third visual indicator 905. The example first visual indicator 902 of FIG. 9 includes a first directional indicator 906. In the illustrated example, the first directional indicator 906 includes first pointers 907 pointing in a first direction. In the illustrated example, the first pointers 907 are pointing to the right in the orientation of FIG. 9.

The example second visual indicator 904 includes a second directional indicator 908. In the illustrated example, the second directional indicator 908 includes second pointers 909 pointing in a second direction opposite the first direction. In the illustrated example, the second pointers 909 are pointing to the left in the orientation of FIG. 9.

In the illustrated example, the first visual indicator 902 and the second visual indicator 904 are displayed to display the third visual indicator 905. In the illustrated example, the first pointers 907 and the second pointers 909 are disposed in a row and are arranged such that when the first pointers 907 and the second pointers 909 are displayed substantially contemporaneously, the first pointers 907 and the second pointers 909 form diamonds 910.

In some examples, the first visual indicator 902 includes a first graphic 912, and the second visual indicator 904 includes a second graphic 914. In the illustrated example, the first graphic 912 and the second graphic 914 are disposed in a column along the row.

Figure 10:
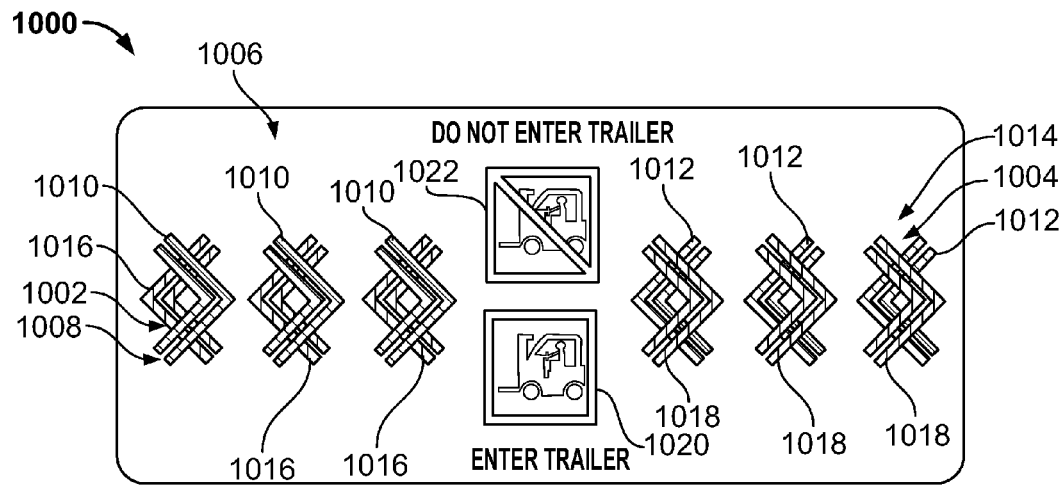
FIG. 10 illustrates another example display disclosed herein, which may be used to implement the example first display of FIG. 1 and/or the example second display of FIGS. 2-4.

FIG. 10 illustrates another example display 1000 disclosed herein. In the illustrated example, the display 1000 displays a first visual indicator 1002, a second visual indicator 1004 and/or a third visual indicator 1006. In the illustrated example, the first visual indicator 1002 includes a first directional indicator 1008 including first pointers 1010 and second pointers 1012. In the illustrated example, the first pointers 1010 point at the second pointers 1012, and the second pointers 1012 point at the first pointers 1010.

The example second visual indicator 1004 includes a second directional indicator 1014 including third pointers 1016 and fourth pointers 1018. In the illustrated example, the third pointers 1016 point away from the fourth pointers 1018, and the fourth pointers 1018 point away from the third pointers 1016.

To display the example third visual indicator 1006, the example display 1000 of FIG. 10 displays the first visual indicator 1002 and the second visual indicator 1004. In the illustrated example, when the first visual indicator 1002 and the second visual indicator 1004 are displayed, portions of the first pointers 1010 intersect portions of the third pointers 1016, and portions of the second pointers 1012 intersect portions of the fourth pointers 1018.

In some examples, the first visual indicator 1002 includes a first graphic 1020, and the second visual indicator 1004 includes a second graphic 1022. In the illustrated example, the first graphic 1020 and the second graphic 1022 are disposed between the first pointers 1010 and the second pointers 1012.

Figure 11:
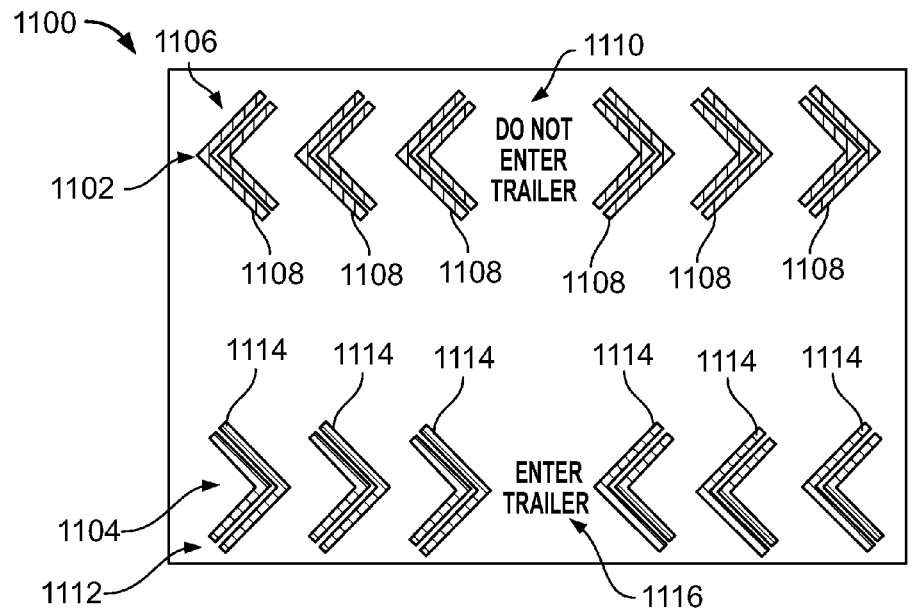
FIG. 11 illustrates yet another example display disclosed herein, which may be used to implement the example first display of FIG. 1 and/or the example second display of FIGS. 2-4.

FIG. 11 illustrates another example display 1100 disclosed herein. In the illustrated example, the display 1100 displays a first visual indicator 1102 and a second visual indicator 1104. The example first visual indicator 1102 of FIG. 11 includes a first directional indicator 1106 comprising first pointers 1108 pointing away from a first graphic 1110. In the illustrated example, the first graphic 1110 is a textual message stating, "DO NOT ENTER TRAILER." In some examples, some or all of the first visual indicator 1102 is displayed in a first color such as, for example, red.

The example second visual indicator 1104 of FIG. 11 includes a second directional indicator 1112 comprising second pointers 1114 pointing toward a second graphic 1116. In the illustrated example, the second graphic 1116 is a textual message stating, "ENTER TRAILER." In other examples, the first graphic 1110 and/or the second graphic 1116 are other textual messages. In some examples, some or all of the second visual indicator 1104 is displayed in a second color such as, for example, green.

Figure 12:
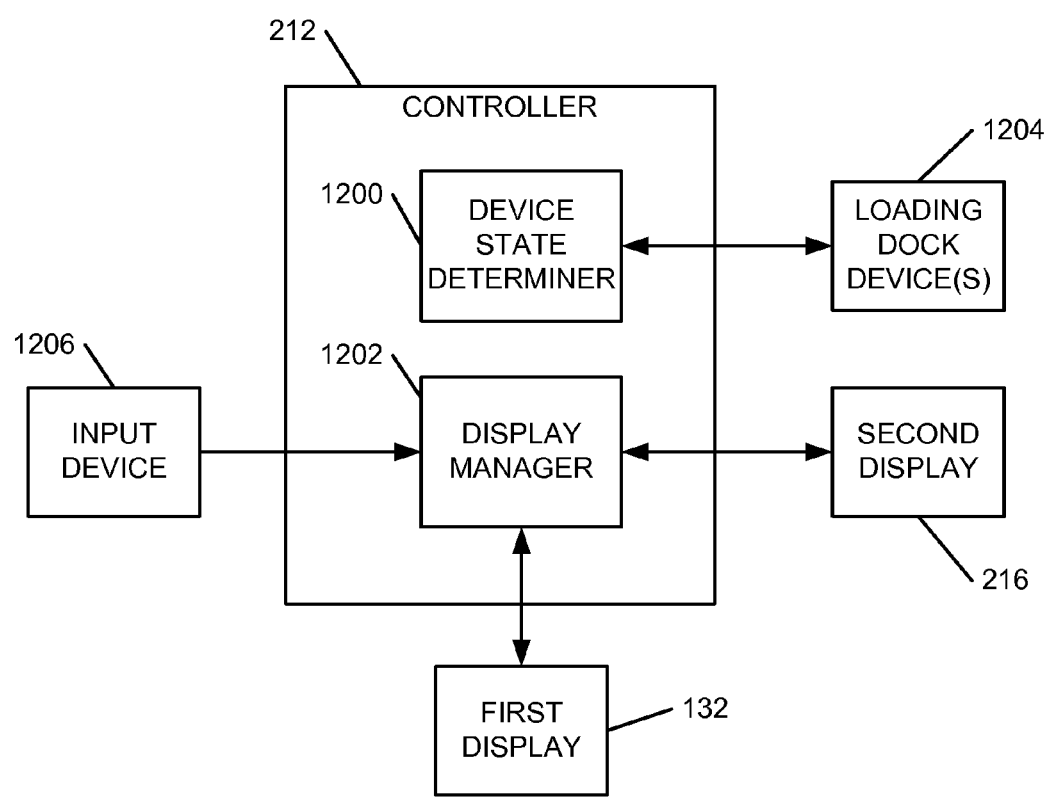
FIG. 12 is a block diagram representative of the example controller of FIG. 2.

FIG. 12 is a block diagram representative of the example controller 212 of FIG. 2-5. In the illustrated example, the controller 212 includes a device state determiner 1200 and a display manager 1202. The example device state determiner 1200 is in communication with one or more loading dock devices 1204 such as, for example, the vehicle restraint 112, the wheel lock 114, the first sensor 118, the second sensor 122, the door 124, the speaker 126, the camera 128, the proximity sensor(s) 130, the door sensor 200, the first barrier sensor 206, the second barrier sensor 208, the object detector 210, the second display 216 and/or any other device that may be used in conjunction with the example loading dock 102 of FIGS. 1-5. In some examples, the device state determiner 1200 determines a state of one or more of the loading dock devices 1204. For example, in some examples, the device state determiner 1200 determines if the vehicle restraint 112 is in the engaged state or the disengaged state. In some examples, the device state determiner 1200 determines if the door 124 is open or closed. In other examples, the device state determiner determines other states of other devices.

The example display manager 1202 controls the first display 132 and/or the second display 216 to generate one or more visual indicators based on the state of one or more of the loading dock devices 1204 and/or an input received via an input device 1206 such as, for example, one or more of the input devices 218, 220, 222, 224, 226. In some examples, the display manager 1202 communicates one or more commands to the first display 132 and/or the second display 216 to display visual indicators having directional indicator(s) based on the state of the one or more loading dock devices 1204 and/or the input.

While an example manner of implementing the controller 212 of FIG. 2-5 is illustrated in FIG. 12, one or more of the elements, processes and/or devices illustrated in FIG. 12 may be combined, divided, re-arranged, omitted, eliminated and/or implemented in any other way. Further, the example device state determiner 1200, the example display manager 1202, the example loading dock device(s) 1204, the example input device 1206, the example first display 132, the example second display 216 and/or, more generally, the example controller 212 of FIG. 12 may be implemented by hardware, software, firmware and/or any combination of hardware, software and/or firmware. Thus, for example, any of the example device state determiner 1200, the example display manager 1202, the example loading dock device(s) 1204, the example input device 1206, the example first display 132, the example second display 216 and/or, more generally, the example controller 212 of FIG. 12 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, device state determiner 1200, the example display manager 1202, the example loading dock device(s) 1204, the example input device 1206, the example first display 132, the example second display 216 and/or, more generally, the example controller 212 of FIG. 12 is/are hereby expressly defined to include a tangible computer readable storage device or storage disk such as a memory, a digital versatile disk (DVD), a compact disk (CD), a Blu-ray disk, etc. storing the software and/or firmware. Further still, the example controller 212 of FIGS. 2-5 may include one or more elements, processes and/or devices in addition to, or instead of, those illustrated in FIG. 12, and/or may include more than one of any or all of the illustrated elements, processes and devices.

Figure 13:
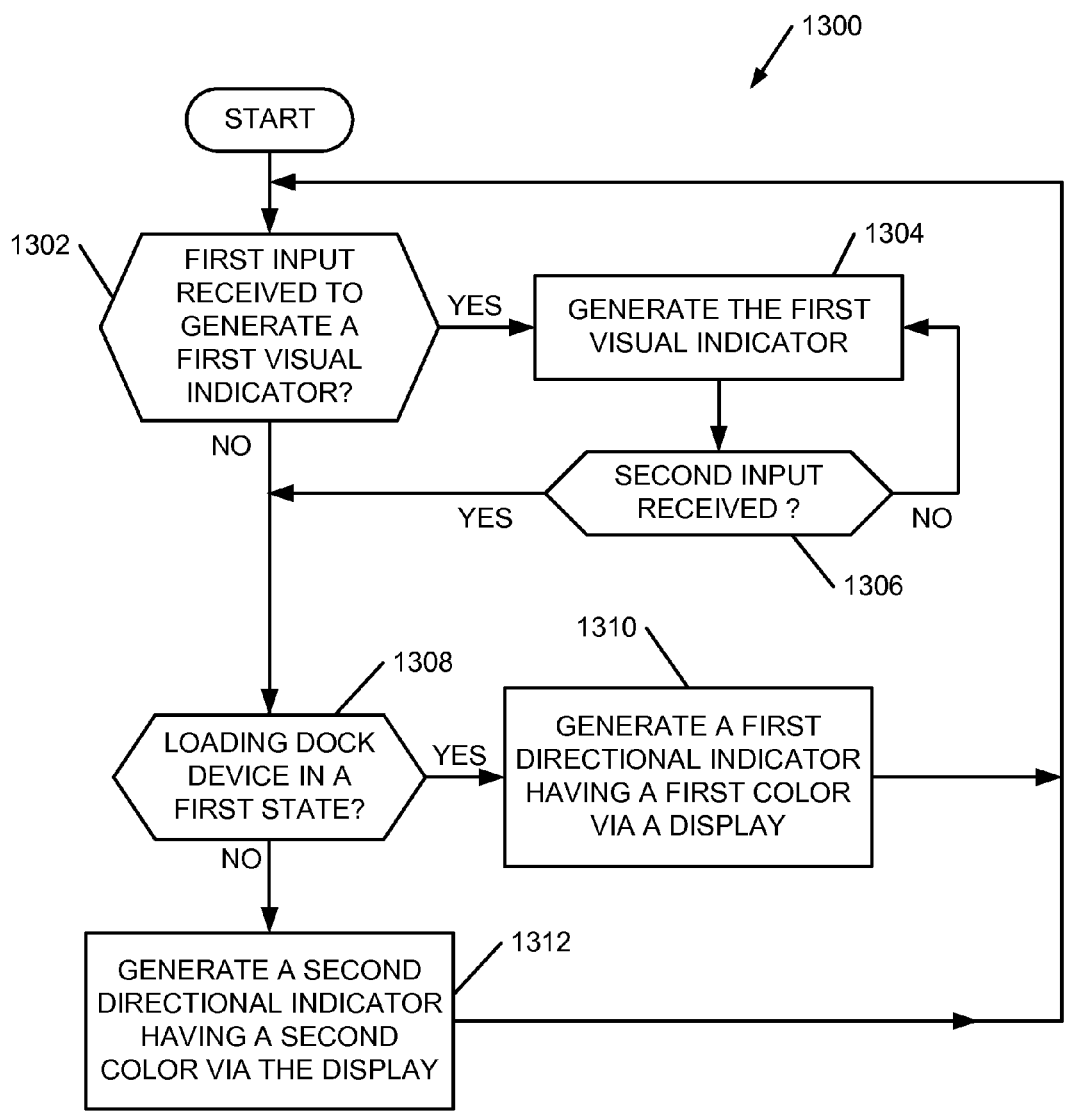
FIG. 13 is a flowchart representative of example machine readable instructions for implementing the example controller of FIG. 12.

A flowchart representative of example machine readable instructions for implementing the example controller 212 of FIG. 12 is shown in FIG. 13. In this example, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 13, many other methods of implementing the example controller 212 may alternatively be used. For example, the order of execution of the blocks may be changed, and/or some of the blocks described may be changed, eliminated, or combined.

As mentioned above, the example processes of FIG. 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program 1300 of FIG. 13 begins at block 1302 by the display manager 1202 determining if a first input to generate a first visual indicator is received. For example, the display manager 1202 may determine if the first input is received by detecting if one or more of the input devices 218, 220, 222, 224, 226 associated with the first input is operated. If the first input is received, the display manager 1202 generates the first visual indicator (block 1304). In some examples, the display manager 1202 generates the first visual indicator by communicating a command to second display 216 to display, for example, the first visual indicator 228 and the second visual indicator 300 of FIGS. 2-3 in an alternating fashion.

The display manager 1202 determines if a second input is received (block 1306). In some examples, the display manager 1202 determines if the second input is received by detecting if one or more of the input devices 218, 220, 222, 224, 226 associated with the second input is operated. If the second input is not received (block 1304), the example program 1300 returns to block 1304, and the first visual indicator continues to be generated.

If the second input is received at block 1304 or the first input is not received at block 1302, the device state determiner 1200 determines if a loading dock device is in a first state (block 1308). For example, in some examples, the device state determiner 1200 determines if the vehicle restraint 112 is in an engaged state in which the vehicle restraint 112 is restraining the vehicle 100. If the loading dock device is in the first state, the display manager 1202 generates a first directional indicator having a first color via a display (block 1310). In some examples, the first directional indicator is generated by generating first pointers and second pointers having the first color. In some examples, a graphic is displayed between the first pointers and the second pointers. For example, if the vehicle restraint 112 is in the engaged state, the display manager 1202 communicates a command to the second display 216 to display the first visual indicator 228 of FIG. 2 having the first directional indicator 230 displayed in green.

If the device state determiner 1200 determines that the loading dock device is not in the first state (block 1308), the display manager 1202 generates a second directional indicator having a second color via the display (block 1312). In some examples, the second directional indicator is generated by generating one or more Xs having the second color. In some examples, the second directional indicator is generated by generating third pointers and fourth pointers pointing away from a graphic. For example, in some examples, if the vehicle restraint 112 is in the disengaged state, the display manager 1202 communicates a command to the second display 216 to display the second visual indicator 300 having the second directional indicator 302 displayed in red.

Figure 14:
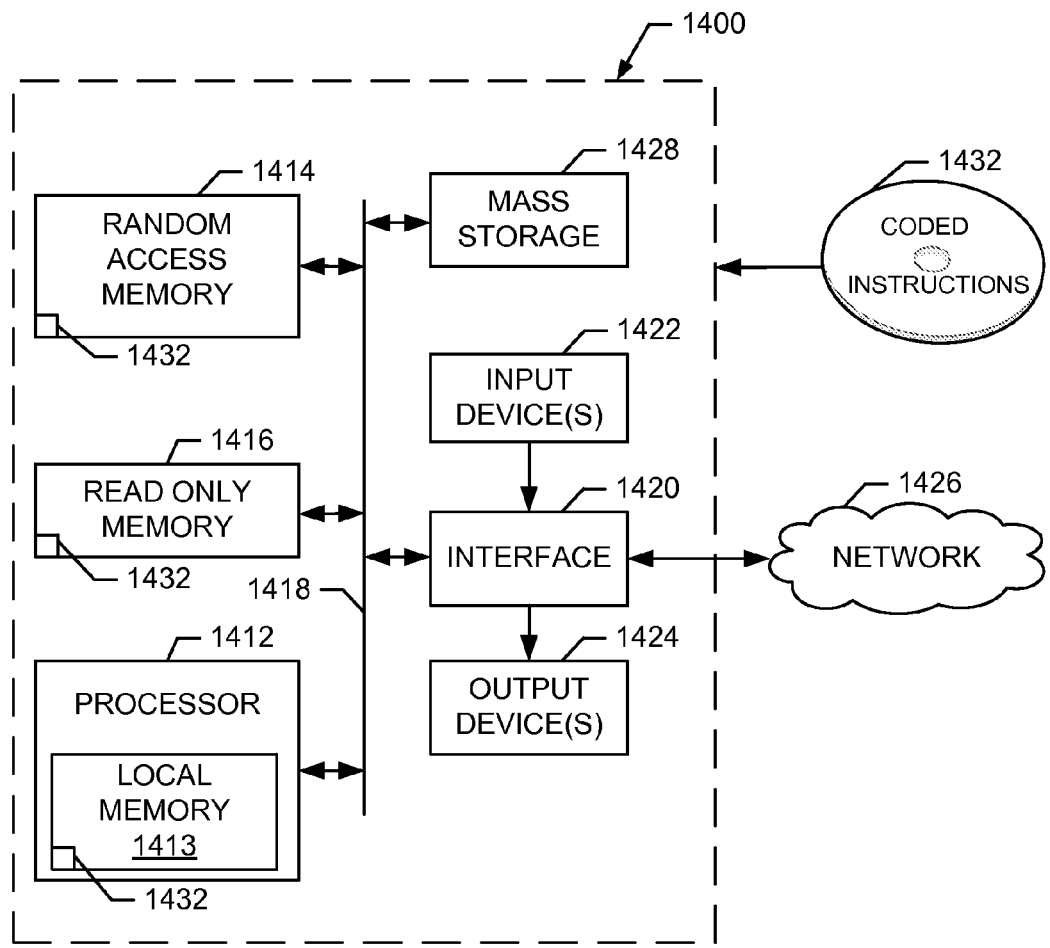
FIG. 14 is a block diagram of an example processor platform capable of executing the instructions of FIG. 13 to implement the example controller of FIG. 12.

FIG. 14 is a block diagram of an example processor platform 1400 capable of executing the instructions of FIG. 13 to implement the controller 212 of FIG. 12. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIG. 13 may be stored in the mass storage device 1428, in the volatile memory 1414, in the non-volatile memory 1416, and/or on a removable tangible computer readable storage medium such as a CD or DVD.

From the foregoing, it will be appreciated that the above disclosed methods, apparatus and articles of manufacture generate visual indicators that indicate directional information. In some examples, the visual indicators include directional indicators that have two or more characteristics that cooperate to indicate the directional information. For example, in some examples, the visual indicators disclosed herein include directional indicators having a first orientation and a first color to enable personnel operating and/or disposed near a loading dock to discern if a vehicle docked at the loading dock may be entered via the loading dock. In some examples, the visual indicators disclosed herein include directional indicators having a second orientation and a second color to enable personnel to discern if the vehicle may dock at the loading dock and/or depart from the loading dock. Thus, the examples disclosed herein indicate additional and/or more detailed information than traditional loading dock traffic lights.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a controller in communication with a vehicle restraint of a loading dock; and
   a display in communication with the controller, the display having:
      a first directional indicator and a first graphic adjacent the first directional indicator, in relation to the first graphic the first directional indicator to indicate a first direction, the display to display the first directional indicator in a first orientation relative to the first graphic and a first color if a vehicle is restrained via the vehicle restraint; and
      a second directional indicator and a second graphic adjacent the second directional indicator, in relation to the second graphic the second directional indicator to indicate a second direction, the display to display the second directional indicator in a second orientation relative to the second graphic and a second color if the vehicle is not restrained via the vehicle restraint the first characteristic of the first directional indicator including first pointers and second pointers positioned in a row.

2. The apparatus of claim 1, wherein a face of the housing includes the first portion, and wherein a side of the housing includes at least one of a transparent or translucent second portion to be illuminated when at least one of the first directional indicator or the second directional indicator is displayed.

3. The apparatus of claim 1, wherein the display comprises a substantially opaque cover disposed on the housing, the cover including a first window to be illuminated to display the first directional indicator.

4. The apparatus of claim 3, wherein the cover includes a second window to be illuminated to display the second directional indicator, the first window having a first shape, the second window having a second shape being a mirror image of the first shape.

5. The apparatus of claim 1, wherein the first directional indicator comprises first pointers having the first orientation, and the second directional indicator comprises second pointers having the second orientation.

6. The apparatus of claim 1, further comprising an input device in communication with the controller, wherein the display is to display the first directional indicator and the second directional indicator if the controller detects operation of the input device.

7. An apparatus, comprising:
   a controller in communication with a device of a loading dock, the controller to determine a state of the device; and
   a display in communication with the controller, the display including a first directional indicator and a first graphic adjacent the first directional indicator, the display to display the first directional indicator based on the state of the device, the first directional indicator having a first characteristic to indicate a direction and a second characteristic to indicate at least one of permissiveness or nonpermissiveness the first characteristic of the first directional indicator including first pointers and second pointers positioned in a row.

8. The apparatus of claim 7 further comprising a housing including the display, wherein the controller is disposed inside the housing.

9. The apparatus of claim 8, wherein the housing includes an input device in communication with the controller, the display to display a visual indicator if the controller detects operation of the input device.

10. The apparatus of claim 8, wherein the display is disposed on a face of the housing, and the housing includes a side to be illuminated when the first directional indicator is displayed.

11. The apparatus of claim 7, further comprising a light fixture of the loading dock in communication with the controller, the light fixture to generate a second visual indicator having at least one of the first characteristic or the second characteristic.

12. A method, comprising:
    determining a state of a device of a loading dock; and
    based on the state, generating via a display a graphic and a first directional indicator having a first orientation and a first color, the graphic adjacent the first directional indicator, the first orientation and the first color to cooperate to indicate first directional information relative to the graphic.

13. The method of claim 12, further comprising displaying the graphic between the first pointers and the second pointers.

14. The method of claim 13, wherein the first pointers and the second pointers indicate a direction relative to the graphic.

15. The method of claim 12, wherein the first pointers point toward the second pointers, and the second pointers point toward the first pointers.

16. The method of claim 12, wherein the first pointers point away from the second pointers, and the second pointers point away from the first pointers.

17. An apparatus, comprising:
    a controller in communication with a vehicle restraint of a loading dock; and
    a display in communication with the controller, the display having:
       a first directional indicator and a first graphic adjacent the first directional indicator, in relation to the first graphic the first directional indicator to indicate a first direction, the display to display the first directional indicator in a first orientation relative to the first graphic and a first color if a vehicle is restrained via the vehicle restraint, the first directional indicator including first pointers having the first orientation; and
       a second directional indicator and a second graphic adjacent the second directional indicator, in relation to the second graphic the second directional indicator to indicate a second direction, the display to display the second directional indicator in a second orientation relative to the second graphic and a second color if the vehicle is not restrained via the vehicle restraint, the second directional indicator including second pointers having the second orientation, the first graphic is positioned between the first pointers and the second pointers.

18. The apparatus of claim 17, further comprising a housing having at least one of a transparent or translucent first portion, the first portion to be illuminated to display the first directional indicator.

19. An apparatus, comprising:
a controller in communication with a vehicle restraint of a loading dock; and
a display in communication with the controller, the display having:
  a first directional indicator and a first graphic adjacent the first directional indicator, in relation to the first graphic the first directional indicator to indicate a first direction, the display to display the first directional indicator in a first orientation relative to the first graphic and a first color if a vehicle is restrained via the vehicle restraint, the first directional indicator includes green pointers pointing toward the first graphic to indicate that the vehicle is restrained, and;
  a second directional indicator and a second graphic adjacent the second directional indicator, in relation to the second graphic the second directional indicator to indicate a second direction, the display to display the second directional indicator in a second orientation relative to the second graphic and a second color if the vehicle is not restrained via the vehicle restraint, the second directional indicator includes red pointers pointing away from the second graphic to indicate that the vehicle is not restrained.

* * * * *

UNITED STATES PATENT AND TRADEMARK OFFICE
CERTIFICATE OF CORRECTION

PATENT NO. : 9,564,072 B2
APPLICATION NO. : 13/935006
DATED : February 7, 2017
INVENTOR(S) : Jason Senfleben et al.

It is certified that error appears in the above-identified patent and that said Letters Patent is hereby corrected as shown below:

In the Claims

• Column 17, Lines 34-36 (Claim 1): after "vehicle restraint" delete "the first characteristic of the first directional indicator including first pointers and second pointers positioned in a row" and after "vehicle restraint" add "--; and a housing having at least one of a transparent or translucent first portion, the first portion to be illuminated to display the first directional indicator."

• Column 18, Line 29 (Claim 12): add "being" between "graphic" and "adjacent"

• Column 18, Line 32 (Claim 12): after "graphic" add "--; wherein generating the first directional indicator comprises generating first pointers and second pointers in a row."

Signed and Sealed this
Second Day of May, 2017

Michelle K. Lee
*Director of the United States Patent and Trademark Office*